United States Patent
Frantz et al.

(10) Patent No.: US 9,845,423 B2
(45) Date of Patent: Dec. 19, 2017

(54) GROUT FLUIDS FOR USE IN A GEOTHERMAL WELL LOOP

(71) Applicant: Halliburton Energy Services, Inc., Houston, TX (US)

(72) Inventors: Eric Benjamin Frantz, Houston, TX (US); Rebecca Marie Henry, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/022,655

(22) PCT Filed: Apr. 29, 2015

(86) PCT No.: PCT/US2015/028140
§ 371 (c)(1),
(2) Date: Mar. 17, 2016

(87) PCT Pub. No.: WO2016/175774
PCT Pub. Date: Nov. 3, 2016

(65) Prior Publication Data
US 2017/0058181 A1    Mar. 2, 2017

(51) Int. Cl.
*E21B 33/14* (2006.01)
*C09K 8/467* (2006.01)
(Continued)

(52) U.S. Cl.
CPC .............. *C09K 8/467* (2013.01); *C04B 22/08* (2013.01); *C04B 22/16* (2013.01); *C04B 28/001* (2013.01);
(Continued)

(58) Field of Classification Search
CPC .......... C09K 8/467; C09K 5/14; C04B 22/08; C04B 22/16; C04B 2103/408;
(Continued)

(56) References Cited

U.S. PATENT DOCUMENTS 4,495,800 A    1/1985   Wilcox
4,568,708 A    2/1986   Mason et al.
(Continued)

FOREIGN PATENT DOCUMENTS

EP    0662113 A1    7/1995
EP    1708973 A1    10/2006
(Continued)

OTHER PUBLICATIONS

International Search Report and Written Opinion for PCT/US2015/028140 dated Jan. 26, 2016.

*Primary Examiner* — Silvana Runyan
(74) *Attorney, Agent, or Firm* — McDermott Will & Emery LLP

(57) ABSTRACT

A method of forming a set grout includes steps of preparing a grout additive fluid comprising a fresh water base fluid and a grout additive control package comprising a primary additive selected from the group consisting of an inhibitor, a dispersant, a thermally conductive material, and any combination thereof; introducing an aqueous swellable clay into the grout additive fluid, thereby forming a final grout fluid; and introducing the final grout fluid into an annulus in a subterranean formation, the annulus formed between an exterior of a geothermal well loop tubular and the subterranean formation. The ordering of additives in the method results in enhanced effectiveness of the additives, which may reduce the amount of additive loading required.

20 Claims, 1 Drawing Sheet

(51) Int. Cl.
*C09K 8/504* (2006.01)
*C09K 8/506* (2006.01)
*C09K 8/508* (2006.01)
*C04B 28/00* (2006.01)
*C04B 28/02* (2006.01)
*C04B 22/08* (2006.01)
*C04B 22/16* (2006.01)
*C09K 5/14* (2006.01)
*F24J 3/08* (2006.01)
*C04B 103/40* (2006.01)
*C04B 111/70* (2006.01)

(52) U.S. Cl.
CPC ............... *C04B 28/02* (2013.01); *C09K 5/14* (2013.01); *C09K 8/506* (2013.01); *C09K 8/508* (2013.01); *C09K 8/5045* (2013.01); *E21B 33/14* (2013.01); *F24J 3/081* (2013.01); *C04B 2103/408* (2013.01); *C04B 2111/70* (2013.01); *C04B 2201/32* (2013.01); *C09K 2208/08* (2013.01); *C09K 2208/10* (2013.01); *F24J 2003/088* (2013.01); *Y02E 10/12* (2013.01)

(58) Field of Classification Search
CPC ... C04B 111/70; C04B 2201/70; E21B 33/14; F24J 3/081; E24J 2003/088
See application file for complete search history.

(56) References Cited

U.S. PATENT DOCUMENTS

| | | | |
|---|---|---|---|
| 4,650,593 A | 3/1987 | Slingerland | |
| 4,964,918 A | 10/1990 | Brown et al. | |
| 5,826,669 A | 10/1998 | Zaleski et al. | |
| 7,067,004 B2 | 6/2006 | Matula et al. | |
| 7,087,554 B2 | 8/2006 | Youngson et al. | |
| 7,452,417 B2 | 11/2008 | Matula et al. | |
| 7,825,072 B2 * | 11/2010 | Carbajal | C09K 8/12 175/57 |
| 7,938,904 B1 * | 5/2011 | Wiggs | C04B 28/02 106/713 |
| 7,997,342 B2 | 8/2011 | Welton et al. | |
| 8,084,402 B2 | 12/2011 | Berry et al. | |
| 8,119,718 B2 | 2/2012 | von Benten | |
| 8,623,794 B2 | 1/2014 | Chatterji et al. | |
| 2005/0166802 A1 | 8/2005 | Matula et al. | |
| 2006/0108150 A1 | 5/2006 | Luke et al. | |
| 2006/0243166 A1 | 11/2006 | Matula et al. | |
| 2007/0125274 A1 | 6/2007 | Miller | |
| 2008/0251755 A1 | 10/2008 | Matula et al. | |
| 2010/0071596 A1 | 3/2010 | Konczak | |
| 2011/0305830 A1 | 12/2011 | Frantz et al. | |
| 2011/0308259 A1 | 12/2011 | Wray et al. | |
| 2012/0184468 A1 | 7/2012 | Matula et al. | |
| 2012/0247766 A1 | 10/2012 | Hemmings | |
| 2014/0014341 A1 | 1/2014 | Hathcox et al. | |
| 2014/0303049 A1 | 10/2014 | Holdsworth | |

FOREIGN PATENT DOCUMENTS

| | | |
|---|---|---|
| EP | 2024460 A1 | 2/2009 |
| EP | 2480511 A1 | 8/2012 |
| EP | 2712853 A1 | 4/2014 |
| WO | 9406881 A1 | 3/1994 |
| WO | 9514643 A1 | 6/1995 |
| WO | 2005073144 A1 | 8/2005 |
| WO | 2007141507 A1 | 12/2007 |
| WO | 2010104835 A1 | 9/2010 |
| WO | 2011034545 A1 | 3/2011 |
| WO | 2014011442 A1 | 1/2014 |
| WO | 2014123709 A1 | 8/2014 |
| WO | 2014179112 A1 | 11/2014 |
| WO | 2014186098 A1 | 11/2014 |

* cited by examiner

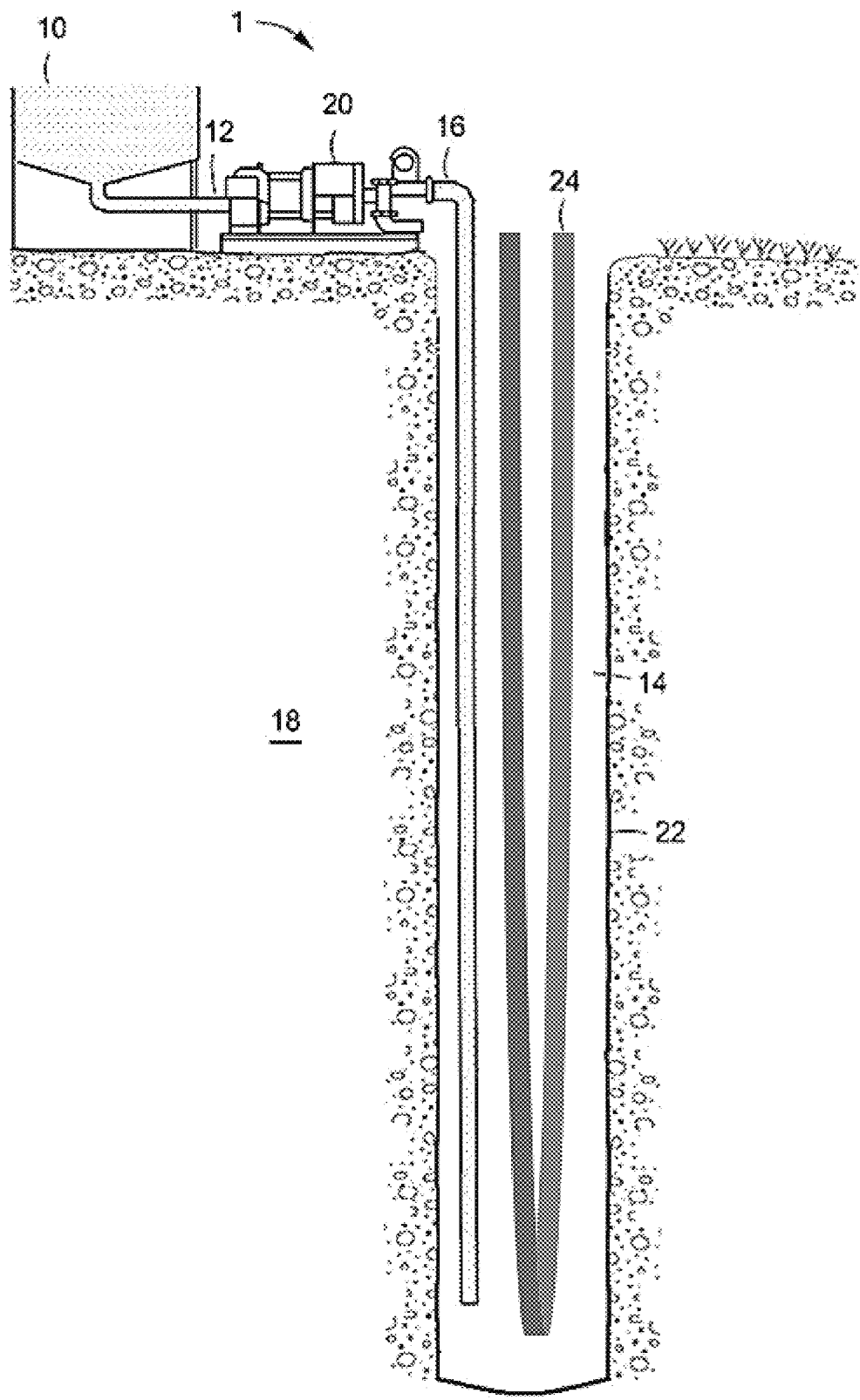

GROUT FLUIDS FOR USE IN A GEOTHERMAL WELL LOOP

BACKGROUND

The embodiments herein relate generally to geothermal well loops in a subterranean formation and, more particularly, to grout fluids for use in grouting the annulus between the geothermal well loop and the subterranean formation.

Geothermal well loops (or simply "well loops") provide an energy-efficient, cost-effective, and environmentally friendly heating and cooling systems that transfer heat to and from the ground. Since the Earth's subsurface is at a near constant temperature year round, it is an efficient heat exchange medium. In a vertical closed well loop system, two pipes joined by a U-shaped connector at the bottom, forming a continuous tubular, are placed vertically in a wellbore drilled in a subterranean formation. This type of system is generally used for heating and cooling residential and commercial buildings. A thermally enhanced grout that is clay-based, typically bentonite-based, and is pumped into a wellbore to fill the annular space between the tubular and the formation. The grout forms a seal to prevent contamination of the subsurface from the surface, as well as preventing groundwater contamination. The grout fluids may further include conductive materials to aid in transferring temperature between the well loop and the Earth. For example, a carrier fluid may be circulated through the well loop to transfer heat to and from a heat exchanger at the surface. In the winter, the fluid collects heat from the ground and carries it to the heat exchanger at the surface, which provides heat to a house or building. The process is reversed in the summer to remove heat from the surface and place it in the ground, thus cooling the house or building.

Grout fluids have a high solids content (e.g., about 35 to about 72% total solids by weight. However, such grout fluids must be easily flowable at the surface and able to set (i.e., cure) after being placed into a wellbore. Once the grout is set, it must be able to suspend the conductive materials as well have a low permeability to provide an effective seal and to prevent water-phase separation.

In traditional applications, a clay (e.g., bentonite) is added to water and mixed to ensure hydration in a tank (e.g., with a paddle mixer). The conductive materials are added next, and pumping begins once all of the conductive materials have been added. The products are mixed and pumped quickly to ensure that the grout does not set up in the mixing tank and plug the system. A dual piston pump may be used to pump the grout into a wellbore through a tremie line. As used herein, the term "tremie" refers to a tubular, such as a pipe, through which a grout fluid is placed into a wellbore. The term "tremie" as used herein is not limited to grout fluid placement at a particular water level and use of a tremie to place grout fluid may be performed below or above water level, without departing from the scope of the present disclosure. A piston pump may be used because of its ability to pump materials with a high solids content at higher pressures. The tremie is then slowly retracted back to the surface with the bottom of the line staying submerged in the grout to prevent formation of cavities in the grout column.

BRIEF DESCRIPTION OF THE DRAWINGS

The following FIGURE is included to illustrate certain aspects of the embodiments described herein, and should not be viewed as exclusive embodiments. The subject matter disclosed is capable of considerable modifications, alterations, combinations, and equivalents in form and function, as will occur to those skilled in the art and having the benefit of this disclosure.

FIG. 1 illustrates a schematic of a system that can deliver the final grout fluid of the present disclosure to a downhole location for grouting a geothermal well loop, according to one or more embodiments of the present disclosure.

DETAILED DESCRIPTION

The embodiments herein relate generally to geothermal well loops in a subterranean formation and, more particularly, to grout fluids for use in grouting the annulus between the geothermal well loop and the subterranean formation.

Specifically, the methods of the present disclosure relate to a ordering of additives (e.g., dispersant and inhibitor additives) to form a grout fluid that results in enhanced effectiveness of the additives in the grout fluid and, consequently, a reduction in the amount of additive loading required. The effectiveness of the ability of the additives to delay the viscosity development of the grout fluid may be enhanced, such that the lifetime of pumping equipment, and other necessary equipment, may be prolonged. By so doing, the type of clay used in forming the grout fluids may also be widened. Accordingly, the methods disclosed herein may reduce both financial costs related to the amount of additives required, the wear and tear on operational equipment, and the expansion of available clays for use, as well as operator time required for preparation of the grout fluids and completion of a geothermal well loop system.

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, lithology-related, business-related, government-related, and other constraints, which vary by implementation and from time to time. While a developer's efforts might be complex and time-consuming, such efforts would be, nevertheless, a routine undertaking for those of ordinary skill in the art having benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as molecular weight, reaction conditions, and so forth used in the present specification and associated claims are to be understood as being modified in all instances by the term "about." As used herein, the term "about" encompasses +/−5% of a numerical value. Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps.

When "comprising" is used in a claim, it is open-ended.

As used herein, the term "substantially" means largely, but not necessarily wholly.

For use in grouting fluids for geothermal wells, an aqueous swellable clay, such as bentonite or hectorite, may be used due to their high surface area and volumetric expansion in the presence of water. As used herein, the term "aqueous swellable clay" and grammatical variants thereof refers to a material capable of incorporating aqueous liquid into its structure to increase in volume and/or area. These aqueous swellable clays are also capable of forming negatively charged clay platelet structures. The high surface area and volumetric expansion of such aqueous swellable clays is the result of the interaction of the water molecules with exchangeable cations that reside between the negatively charged clay platelet structures. The hydration causes the aqueous swellable clay to swell and viscosify water by varying degrees. The viscosification effect may depend on the identity of the exchangeable cations on the negatively charged clay platelet structures, which depend on the type of clay selected. For example, the bentonite clays of the Northern Wyoming area naturally contain a high degree of exchangeable sodium cations, which provide result in high viscosity when in the presence of water.

In some embodiments, the cationic species within the clay may be displaced by other cationic species, with varying degrees of displacement ease depending on the specific naturally present cationic species. Accordingly, the degree of hydration and viscosification can be altered, inhibited, or otherwise manipulated to achieve a desired result. For instance, certain cations have may be more likely to replace other naturally present cations in a clay. As an example, monovalent cations may be likely to be replaced by polyvalent cations. Additionally, when ionic charges are equal, cations of larger ionic radii may be likely to replace those of smaller ionic radii. For example, the following cations are listed in hierarchical order of replacement: $Li^+ < Na^+ < K^+ < Rb^+ < Cs^+ < Mg^{2+} < Ca^{2+} < Ba^{2+} < Cu^{2+} < Al^{3+} < Fe^{3+}$. Additionally, certain cationic species, such as $H_3O^+$ and $NH_4^+$ are even higher in hierarchical order of replacement. Clays, such as bentonites, having cations low in the hierarchical order of replacement may swell to a greater extent in an aqueous fluid, leading to increased viscosification.

In traditional grout fluids, certain grout additives (e.g., inert filler material, inhibitors, dispersants, and the like) are dry blended into an aqueous swellable clay. Thereafter, the mixture is added to water and hydration of both the clay and the additives begins simultaneously. In each case, accordingly, competition for the water determines the rate of clay hydration and additives, and the kinetics of the reaction between the clay and the additives determines the effectiveness of the grout fluid. Thus, additive loadings must be finely tuned in order to provide an easily pumpable grout fluid that is capable of suspending any solid additives (e.g., those that are non-dissolvable) both during pumping and once in the annulus in the subterranean formation for forming the grouted geothermal well loop. That is, the grout fluid may be difficult to pump if overly viscosified and hydrated (also limiting pumping time), while grout fluids that are under viscosified and hydrated may be incapable or less effective at suspending solid additives (e.g., those that are non-dissolvable) required in the grout fluid formulation.

The methods of the present disclosure use a sequential series of steps to formulate a grout fluid that results in increased effectiveness of the grout fluid, while simultaneously allowing lower concentrations of certain associated additive loadings, specifically inhibitor and dispersant additives and any secondary additives, as described below. Additionally, the methods of the present disclosure are advantageous in allowing an operator to select among a wider array of aqueous swellable clay types and aqueous swellable clay purities, thereby reducing costs and increasing the availability of useful aqueous swellable clays for grouting applications in geothermal well loops. For example, high grade "yellow" sodium bentonites mined in Wyoming are typically used in the oilfield industry, as well as other high-end industries (e.g., paint, cosmetics, and the like), may be used in the methods described herein. However, lower-grade and more readily available "blue" industrial grade sodium bentonite mined in the Northern Wyoming region used for various industrial applications (e.g., foundry, animal litter, iron ore pelletizing, and the like) may also be used in accordance with the methods described herein. Another type of bentonite termed "OMCA bentonite" is a drilling-grade bentonite clay with API/ISO specifications and produced outside of the United States may additionally be used in accordance with the methods described herein. Lower grade bentonites are also available throughout the world that do not provide sufficient yield to be applied to most applications but may be useful at providing low permeable seals around water retention ponds and artificial lakes. Even these lower grade bentonites may be used in accordance with the methods of the present disclosure, where such non-oilfield bentonites were not previously able to be used in geothermal well loop grouting applications prior to the sequential methods described herein.

As used herein, grade or type of a bentonite specifies the quality of the bentonite according to the number of barrels of 15 cP viscosity fluid that one ton of the bentonite would produce, termed "yield" and measured in barrels per ton (bbl/ton). A barrel is equivalent to 0.1589 $m^3$. Without limitation, the term "industrial grade bentonite" refers to a bentonite having a yield in the range of a lower limit of about 70 bbl/ton, 71 bbl/ton, 72 bbl/ton, 73 bbl/ton, 74 bbl/ton, 75 bbl/ton, 76 bbl/ton, 77 bbl/ton, 78 bbl/ton, 79 bbl/ton, and 80 bbl/ton to an upper limit about 90 bbl/ton, 89 bbl/ton, 88 bbl/ton, 87 bbl/ton, 86 bbl/ton, 85 bbl/ton, 84 bbl/ton, 83 bbl/ton, 82 bbl/ton, 81 bbl/ton, and 80 bbl/ton, encompassing any value and subset therebetween. The term "high yield bentonite" refers to a bentonite having a yield greater than about 90 bbl/ton, and the term "low yield bentonite" refers to a bentonite having a yield less than about 70 bbl/ton. The yield of any particular bentonite will be dependent on the type of bentonite being evaluated and, thus, these yield values are merely generally representative.

The methods described herein specifically employ dry bending of grout additives, followed by their addition into a fresh water base fluid in the absence of an aqueous swellable clay to allow the grout additives to become suspended or dissolved in the fresh water base fluid. After such addition, the aqueous swellable clay is then added to the grout fluid for use in pumping and forming a set grout in the annulus around a geothermal well loop. Certain of the grout additives are substantially suspended in the fresh water base fluid, and certain of the grout additives are substantially dissolved in the fresh water base fluid prior to the addition of the aqueous swellable clay. As used herein, the term "suspension," and grammatical variants thereof (e.g., "suspended," "suspend," and the like), refers to a substantially homogeneous mixture of a grout additive in the fresh water base fluid. Such suspension may be achieved by mechanical mixing, agitation, viscosification of the fresh water base fluid, and the like. As used herein, the term "dissolution," and grammatical variants thereof (e.g., "dissolved," "dissolve," and the like) refers to a substance or solute that is chemically solvated into a solvent due to chemical interactions and is thermodynamically and kinetically favored to result in a uniform disruption of solvated species though the solvent. As such the solvated species interacts with solvent molecules and is fully distinct in form from its non-solvated form. In some embodiments, the dissolvable grout additives may become greater than about 90% dissolved in the fresh water base fluid prior to the addition of the aqueous swellable clay. That is, the dissolvable grout additives may become about 90%, 91%, 92%, 93%, 94%, 95%, 96%, 97%, 98%, 99%, or 100% dissolved in the fresh water base fluid prior to the addition of the aqueous swellable clay.

In some embodiments, the methods of the present disclosure provide preparation of a grout additive fluid comprising a fresh water base fluid and a grout additive control package. As used herein, the term "fresh water base fluid" and grammatical variants thereof (e.g., "fresh water") refers to an aqueous fluid comprising a calcium hardness value of less than about 100 parts per million (ppm), and a salt concentration of less than about 500 ppm. The fresh water may generally be from any source, provided that it qualifies as fresh water, including reclaimed or recovered water from subterranean formation operations, or wastewater, tap water, seawater, and/or brine that has been treated to comply with the fresh water base fluid requirements of the present disclosure.

The grout additive control package of the present disclosure may comprise at least one primary additive including, but not limited to, an inhibitor, a dispersant, a thermally conductive material, and any combination thereof. The inhibitor and the dispersant in the grout additive control packages of the present disclosure are dissolvable in the fresh water base fluid, whereas the thermally conductive material is suspendable, but not dissolvable. The dissolvable grout additive control package components may be dissolved into the fresh water base fluid, such that at least about 90% of the combined inhibitor and dispersant are dissolved in the fresh water base fluid and the thermally conductive material is substantially homogeneously suspended in the fresh water base fluid, thereby forming the grout additive fluid. As used herein, the term "grout additive fluid" comprises a fresh water base fluid comprising at least one grout additive package component, as described herein. After sufficient dissolution and suspension of the grout additive control package, an aqueous swellable clay may be introduced into the grout additive fluid, thereby forming a final grout fluid. As used herein, the term "final grout fluid" comprises a fresh water fluid comprising at least one grout additive package described herein, and further at least one aqueous swellable clay. The order of operations is critical to the methods of the present disclosure, where the grout additive control package components are first sufficiently suspended or dissolved, depending on the grout additive control package component, in the fresh water base fluid before introduction of the aqueous swellable clay.

Thereafter, final grout fluid may be introduced into an annulus in a subterranean formation, wherein the annulus is formed between an exterior of a geothermal well loop tubular and the subterranean formation. Therein, the final grout fluid may be set within the annulus. As used herein, the term "set" and grammatical variants thereof (e.g., "setting") refers to at least about 90% complete hydration of the final grout fluid into a hardened mass. In some embodiments, the final grout fluid may begin to set (i.e., begin hydration) immediately upon addition of the aqueous swellable clay into the in the grout additive fluid. However, any setting must be controlled such that the pumpability of the final grout fluid is not compromised, depending on the type of pumping equipment utilized. In some embodiments, the viscosity of the final grout fluid is allowed to proceed prior to pumping the final grout fluid into a subterranean formation comprising a geothermal well loop such that the viscosity is in the range of from a lower limit of about 20 centipoise (cP), 40 cP, 60 cP, 80 cP, 100 cP, 120 cP, 140 cP, 160 cP, 180 cP, 200 cP, 220 cP, 240 cP, and 260 cP to an upper limit of about 500 cP, 480 cP, 460 cP, 440 cP, 420 cP, 400 cP, 380 cP, 360 cP, 340 cP, 320 cP, 300 cP, 280 cP, and 260 cP, encompassing any value and subset therebetween. In some instances, even higher viscosities of the final grout fluid may remain pumpable, depending on the pumping equipment available. Each of these values is critical and may depend on, among other things, the type of pumping equipment used, the type of grout additive control package, the type of aqueous swellable clay(s), the pumping equipment, and the like. That is, the viscosity may be controlled or otherwise monitored to ensure that it does not reach beyond a critical level before introducing the final grout fluid into a subterranean formation, without departing from the scope of the present disclosure.

The set final grout fluid of the present disclosure may further be characterized as having a low permeable hydraulic seal of less than about $1 \times 10^{-7}$ centimeters per second (cm/s), or less than about $1 \times 10^{-8}$ cm/s, or less than about $1 \times 10^{-9}$ cm/s, or less than about $1 \times 10^{-10}$ cm/s, or even less, without departing from the scope of the present disclosure.

Additionally, the set final grout fluid may possess shear strength, thereby imparting robustness to the set final grout fluid to react without failure to natural stresses within the subterranean formation and surrounding the geothermal well loop, as well as ensuring that the suspended grout additive control package components (e.g., primary and/or secondary additives) do not settle within the annulus prior to completion of setting. In some embodiments, the set final grout fluid may possess a shear strength of at least about 200 pounds per 100 square feet (lb/100 ft$^2$) at surface pressure and temperature. As described herein, the term "surface pressure" is 1 atmosphere (ATM), and the term "standard pressure" is in the range of a lower limit of about 10° C., 12° C., 14° C., 16° C., 18° C., and 20° C. to an upper limit of about 30° C., 28° C., 26° C., 24° C., 22° C., and 20° C., encompassing any value and subset therebetween. Although an upper limit of the shear strength is not limiting and may be designed based on the requirements of a particular geothermal well loop, in some embodiments, the set final grout fluid may possess a shear strength in the range of a lower limit of about 200 lb/100 ft$^2$, 1000 lb/100 ft$^2$, 2000 lb/100 ft$^2$, 4000 lb/100 ft$^2$, 6000 lb/100 ft$^2$, 8000 lb/100 ft$^2$, 10000 lb/100 ft$^2$, 12000 lb/100 ft$^2$, and 14000 lb/100 ft$^2$ to an upper limit of about 30000 lb/100 ft$^2$, 28000 lb/100 ft$^2$, 26000 lb/100 ft$^2$, 24000 lb/100 ft$^2$, 22000 lb/100 ft$^2$, 20000 lb/100 ft$^2$, 18000 lb/100 ft$^2$, 16000 lb/100 ft$^2$, 14000 lb/100 ft$^2$ at standard temperature and pressure, encompassing any value and subset therebetween. In some instances, set final grout fluids may also exhibit compressive strength, particularly those with higher shear strengths.

Without limitation, in some embodiments, the setting time for the final grout fluid may be in the range of a lower limit of about 18 hours (hr), 19 hr, 20 hr, 21 hr, 22 hr, 23 hr, and 24 hr, 25 hr, 26 hr, and 27 hr to an upper limit of about 36 hr, 35 hr, 34 hr, 33 hr, 32 hr, 31 hr, 30 hr, 29 hr, 28 hr, and 27 hr at standard temperature and pressure, encompassing any value and subset therebetween. In some instances, the setting time may be lower or higher and may depend on the composition of the final grout fluid, the geometry of the geothermal well loop, and the like.

As described above, the grout additive control package may comprise a primary additive selected from the group consisting of an inhibitor, a dispersant, a thermally conductive material, and any combination thereof. The grout additive control package is then added to a fresh water base fluid to permit the inhibitor and dispersant to dissolve (e.g., at least about 90% dissolution) in the fresh water base fluid, and to permit the thermally conductive material to become suspended in the fresh water fluid, thereby forming a grout additive fluid. Thereafter, an aqueous swellable clay is added to the grout additive fluid, forming a final grout fluid. Accordingly, of import to the present disclosure, the aqueous swellable clay begins hydration in the final grout fluid after the grout additive control package has already been added therein. Thus, there is no or reduced competition between the primary additives (and secondary additives, as discussed below) and the aqueous swellable clay for the fresh water base fluid. Moreover, the grout additive control package already in place in the fresh water base fluid is immediately able to impart functionality to the final grout fluid and the aqueous swellable clay therein.

Generally, the primary additives of the present disclosure may be present in liquid or solid form. When supplied in solid form, they may be of any shape combination, provided that they are able to be suspended or dissolved in the grout additive fluid (and in the final grout fluid upon adding the aqueous swellable clay(s)) as described herein. For example, the primary additives that are in solid form may be substantially spherical or substantially non-spherical, including fibrous-shaped, polygonal shaped (e.g., cubic shaped), and the like. In some embodiments, the size of the inhibitor and dispersant solid primary additives are such that they exhibit a d90 particle size distribution in the range of a lower limit of about 0.1 micrometers ($\mu m$), 1 $\mu m$, 10 $\mu m$, 100 $\mu m$, 200 $\mu m$, 300 $\mu m$, 400 $\mu m$, 500 $\mu m$, 600 $\mu m$, 700 $\mu m$, 800 $\mu m$, 900 $\mu m$, and 1000 $\mu m$ to an upper limit of about 2000 $\mu m$, 1900 $\mu m$, 1800 $\mu m$, 1700 $\mu m$, 1600 $\mu m$, 1500 $\mu m$, 1400 $\mu m$, 1300 $\mu m$, 1200 $\mu m$, 1100 $\mu m$, and 1000 $\mu m$, encompassing any value and subset therebetween. In some embodiments, the size of the thermally conductive material solid primary additives are such that they exhibit a d90 particle size distribution in the range of a lower limit of about 0.1 $\mu m$, 10 $\mu m$, 100 $\mu m$, 1000 $\mu m$, 2000 $\mu m$, 3000 $\mu m$, 4000 $\mu m$, 5000 $\mu m$, 6000 $\mu m$, 7000 $\mu m$, 8000 $\mu m$, 9000 $\mu m$, and 10000 $\mu m$ to an upper limit of about 20000 $\mu m$, 19000 $\mu m$, 18000 $\mu m$, 17000 $\mu m$, 16000 $\mu m$, 15000 $\mu m$, 14000 $\mu m$, 13000 $\mu m$, 12000 $\mu m$, 11000 $\mu m$, and 10000 $\mu m$, encompassing any value and subset therebetween. As used herein, the term "d90" refers to 90% of particles (e.g., the solid primary additives) having a size of less than a specific value. Each of these values is critical to the embodiments of the present disclosure and may depend on a number of factors including, but not limited to, the type of solid grout additive selected, the desired set qualities of the final grout fluid, and the like.

As discussed below, the secondary additives that may be included in the grout additive control packages of the present disclosure likewise may not be limited in shape and may exhibit the same d90 particle size distribution of the primary additives (i.e., less than about 90 mesh), although it is not necessary, although it may be true, that the shape and size of any primary and secondary additives are identical. That is, the shape and size of the various additives of the grout additive control packages of the present disclosure may have one or more components that are of the same size, same shape, same size and shape, or all of the one or more components that are of different sizes, different shapes, or different size and shapes, without departing from the scope of the present disclosure.

In some embodiments, an inhibitor may be a primary additive included in the grout additive control package described herein. The inhibitor may be used to delay swelling of the aqueous swellable clay in the final grout fluid of the present disclosure. Accordingly, the inhibitor may be used to maintain the viscosity of the final grout fluid below a critical value, such as that described above, such that the final grout fluid remains pumpable for use in grouting a geothermal well loop in a subterranean formation.

Suitable inhibitors for use in the grout additive control packages of the present disclosure may include, but are not limited to, a salt comprising a cation and an anion, a polymer, a silicate, a partially hydrolyzed polyvinyl acetate, a polyacrylamide, a partially hydrolyzed polyacrylamide, a polyalkylene glycol (e.g., polybutylene glycol, polyethylene glycol, polypropylene glycol, and the like), a polyalkylene alcohol, a polyalkylene alkoxylate, a polyalkylene oligomer, a polyalkylene polymer, a polyalkylene copolymer, a cationic oligomer or polymer, an acid, a potassium salt (e.g., potassium fluoride, potassium chloride, potassium chlorate, potassium bromide, potassium iodide, potassium iodate, potassium acetate, potassium citrate, potassium formate, potassium nitrate, potassium phosphate dibasic, potassium phosphate monobasic, potassium sulfate, potassium bisulfate, potassium carbonate, potassium dichromate, potassium ferrate, and the like), an ammonium salt, a sodium salt, an iron salt, an aluminum salt, a phosphonium salt, polyaminopolyamide-epichlorohydrin resin, diallydimethylammonium chloride, polydiallyldimethylammonium chloride, aminoethylethanolamine, diethylenetriamine, triethylenetetramine, diethanolamine, triethanolamine, polyvinyl pyrrolidone, potassium silicate, potassium carbonate, tribasic potassium phosphate, and any combination thereof.

In some embodiments, the inhibitor comprising a salt comprising a cation and an anionic may be such that the cation includes, but is not limited to, at least one of lithium, potassium, sodium, hydronium, ammonium, calcium, magnesium, a quaternary amine, magnesium, calcium, strontium, barium, titanium, cesium, vanadium, chromium, manganese, iron, cobalt, nickel, copper, zinc, aluminum, zirconium, and any combination thereof; and the anion includes, but is not limited to at least one of chloride, bromide, nitrate, iodide, hydroxide, nitrite, hexafluoroantimonate, hexafluoroarsenate, hexafluorophosphate, propionate, lactate, tartrate, phosphate, phosphonium, borate, silicate, sulfate, acetate, aluminate, chromate, dichromate, permanganate, chlorate and perchlorate, formate, and any combination thereof.

In other embodiments, the inhibitor may comprise a cationic oligomer or polymer. Suitable such cationic oligomers or polymers may comprise at least one monomer including, but not limited to, imine, alkylene imine, ethylene imine, propylene imine, amine, ethylene amine, an organoamine, a quaternary amine, acrylamide, methacrylamide, putresine, cadaverine, spermidine, spermine, diethylenetriamine, tetramethylenediamine, triethylenetetramine, tetraethylenepentamine, diallyldimethylammonium chloride, (2-methacryloyloxyethyl) trimethyl ammonium chloride, vinyl pyrrolidone, any derivative thereof, any salt thereof, and any combination thereof.

Suitable silicates for use as the inhibitor of the present disclosure may be of any type suitable for said use including silicate salts, oligomeric silicates, polymeric silicates, and the like. Examples of suitable silicates may include, but are not limited to, an alkali earth metal silicate, an alkaline earth metal silicate, and any combination thereof, such as sodium silicate, calcium silicate, potassium silicate, sodium metasilicate, calcium metasilicate, potassium metalsilicate, and the like.

The inhibitor(s) for use in forming the final grout fluid of the present disclosure, including any additional grout additive control package components and the aqueous swellable clay(s) described herein, may be present in the grout additive control packages to achieve a range of from a lower limit of about 0.001%, 0.0025%, 0.005%, 0.0075%, 0.01%, 0.025%, 0.05%, 0.075%, 0.1%, 0.25%, 0.5%, 0.75%, 1%, 1.25%, and 1.5% to an upper limit of about 5%, 4.75%, 4.5%, 4.25%, 4%, 3.75%, 3.5%, 3.25%, 3%, 2.75%, 2.5%, 2.25%, 2%, 1.75%, and 1.5% by weight of the final grout fluid, encompassing any value and subset therebetween. Each of these values is critical and may be contingent on the degree of inhibition required, depending on such elements as the amount and composition of the grout additive control package, the amount and type of the aqueous swellable clay(s), conditions of the subterranean formation, and the like.

A dispersant may be included in the grout additive control packages of the present disclosure. The dispersant may be used as a thinner or deflocculant for increasing the setting time of the final grout fluid by, without being bound by theory, reducing the viscosity of the final grout fluid. In some embodiments, the dispersant may include, but is not limited to, derivatives of an acid, salts of derivatives of an acid, phosphates, sodium carbonates, polymeric or monomeric sodium silicate complexes (e.g., sodium metasilicate, water glass, and the like), lignite compounds, and low molecular weight polymers, soaps, surfactants, sulfonates, and any combination thereof.

The derivatives of an acid that may be used as dispersants in the grout additive control packages of the present disclosure may include, but are not limited to, derivatives of tannic acid, derivatives of citric acid (e.g., citrate), derivatives of humic acid, derivatives of phosphoric acid, disodium hydrogen phosphate, trisodium phosphate, dihydrogen phosphate, quebracho, derivatives of quebracho, sulfornethylated quebracho, derivatives of sulfomethylated quebracho, alkylated queracho, derivatives of alkylated queracho, a naphthalene sulfonic acid condensed with formaldehyde, and any combination thereof. Salts of these derivatives of an acid may also be suitable as a dispersant (e.g., a sodium salt of a derivative of an acid), including, but not limited to, sodium humate, sodium phosphate, sodium citrate, sodium tannate, and the like, and any combination thereof. Suitable phosphates for use as the dispersant in the grout additive control packages described herein may include, but are not limited to, sodium polyphosphate, tetrasodium polyphosphate, sodium tripolyphosphate, sodium hexametaphosphate, sodium acid pyrophosphate, sodium metaphosphate, sodium esametaphosphate, and any combination thereof. Suitable lignite compounds may include, but are not limited to, lignosulfonates, lignosulfonate alkali salts (e.g., sodium, potassium, or alkaline earth metals, such as calcium, and the like), lignosolfonates of acrylic acid, causticized lignites, causticized leonardites, ferro lignosulfonates, chrome lignosulfonates, ferro-chrome lignosulfonates, transition metal lignosulfonates (e.g., zirconium lignosulfonates, titanium lignosulfonates, and the like), sulfoalkylated lignites, and any combination thereof.

Examples of suitable low molecular-weight polymers may include, but are not limited to, polyacrylates, alkaline salts of polyacrylic acid, poly(sulfonated styrene-co-maleic anhydride), poly(acrylic acid-co-vinyl sulfonic acid), alkaline salts of polymethacrylate, polyacrylamide 2-acrylamido-2-methylpropane sulfonic acid, sodium salts of polyacrylamide 2-acrylamido-2-methylpropane sulfonic acid, polymers produced from condensed naphthalene sulfonic acid sulfonated polymers, polymers of unsaturated dicarboxylic acids, polymers of monoethylenically unsaturated monocarboxylic acids, graft polymers of ethylenically unsaturated monomers and polyalkylene glycols, polymers allyloxybenzenesulfonates, polymeric alkylated salts of allyloxybenzenesulfonates, terpolymers of tetrahydrophthalic acid, acrylic acid and 2-acrylamido-2-methylpropane sulfonic acid and lignosulfonates, graft copolymers of tetrahydrophthalic acid, acrylic acid and 2-acrylamido-2-methylpropane sulfonic acid and lignosulfonates, polymeric organosilicons, and As used herein, the term "low molecular weight polymer" means a polymer with a molecular weight of less than 1,000,000.

Suitable soaps that may be used as the dispersants in the methods described herein may include, but are not limited to, odium stereate, potassium stereate, ammonium stereate, sodium aurate, potassium aurate, sodium myristate, potassium myristate, sodium ricinoleate, potassium ricinoleate, sodium palmitate, potassium palmitate, calcium caprylate, sodium caprylate, potassium caprylate, 4,7,10,13,16,19-docosahexaenoic acid, 4,7,10,13,16-docosapentaenoic acid, 5,8,11,14,17-eicosapentaenoic acid, 5,8,11,14-eicosatetraenoic acid, 5,8,11-eicosatrienoic acid, 6,9,12,15-octadecatetraenoic acid, 7,10,13,16,19-docosapentaenoic acid, 7,10,13,16-docosatetraenoic acid, 8,11,14,17-eicosatetraenoic acid, 8,11,14-eicosatrienoic acid, behenic acid, capric acid, caprylic acid, cis-11-docosenoic acid, cis-11-eicosenoic acid, cis-11-octadecenoic acid, cis-15-tetracosenoic acid, cis-4-decenoic acid, cis-4-dodecenoic acid, cis-4-tetradecenoic acid, cis-5-lauroleic acid, cis-5-tetradecenoic acid, cis-6-octadecenoic acid, cis-9-decenoic acid, cis-9-dodecenoic acid, cis-9-eicosenoic acid, cis-9-hexadecenoic acid, cis-9-tetradecenoic, cis-tetracosenoic acid, caprylic acid decenoic acid, dihydroxystearic acid, docosadienoic acid, docosahexaenoic acid, docosapentaenoic acid, dotriacontanoic acid, eicosadienoic acid, eicosanoic acid, eicosapentaenoic acid, eicosatetraenoic acid, eicosatrienoic acid, eicosenoic acid, erucic acid, heptadecanoic acid, heptadecenoic acid, hexacosanoic acid, hexadecadienoic acid, hexadecenoic acid, lauric acid, linoleic acid, linolenic, myristic acid, nonadecanoic acid, nonanoic acid, octacosanoic acid, octadecatetraenoic acid, octadecatrienoic acid, oleic acid, palmitic acid, pentadecanoic acid, pentadecenoic acid, pentatriacontanoic, ricinoleic acid, stearic acid, tetracosanoic acid, tetradecenoic acid, tetratriacontanoic acid, triacontanoic acid, tridecanoic acid, tritriacontanoic acid, and combinations thereof.

Surfactants that may be used as the dispersants in the methods described herein may include, but are not limited to, a non-ionic surfactant, an anionic surfactant, a cationic surfactant, a zwitterionic surfactant, and any combination thereof. The surfactants may exhibit viscoelastic properties, without departing from the scope of the present disclosure.

Suitable non-ionic surfactants may include, but are not limited to, an alkyoxylate (e.g., an alkoxylated nonylphenol condensate, such as poly(oxy-1,2-ethanediyl), alpha-(4-nonylphenyl)-omega-hydroxy-branched), an alkylphenol, an ethoxylated alkyl amine, an ethoxylated oleate, a tall oil, an ethoxylated fatty acid, an alkyl polyglycoside, a sorbitan ester, a methyl glucoside ester, an amine ethoxylate, a diamine ethoxylate, a polyglycerol ester, an alkyl ethoxylate, an alcohol that has been polypropoxylated and/or polyethoxylated, a linear alcohol alkoxylate, dodecylbenzene sulfonic acid salt derivative, a linear nonyl-phenol, dioxane, ethylene oxide, polyethylene glycol, an ethoxylated castor oil, polyoxyethylene nonyl phenyl ether, tetraethyleneglycoldodecylether, ethylene oxide, decylamine oxide, dodecylamine oxide, an alkylamine oxide, an ethoxylated amide, an alkoxylated fatty acid, an alkoxylated alcohol (e.g., lauryl alcohol ethoxylate, ethoxylated nonyl phenol), an ethoxylated fatty amine, an ethoxylated alkyl amine (e.g., cocoalkylamine ethoxylate), any derivative thereof, and any combination thereof. As used herein, the term "derivative," refers to any compound that is made from one of the identified compounds, for example, by replacing one atom in the listed compound with another atom or group of atoms, or rearranging two or more atoms in the listed compound.

Suitable anionic surfactants may include, but are not limited to, methyl ester sulfonate, a hydrolyzed keratin, polyoxyethylene sorbitan monopalmitate, polyoxyethylene sorbitan monostearate, polyoxyethylene sorbitan monooleate, an alkyl ether sulfate, sodium 4-(1'heptylnonyl) benzenesulfonate, sodium dioctyl sulphosuccinate, sodium octylbenzenesulfonate, sodium hexadecyl sulfate, sodium laureth sulfate, a quaternary ammonium compound (e.g., a trimethylcocoammonium chloride, a trimethyltallowammonium chloride, a dimethyldicocoammonium chloride, and the like), a cetylpyridinium chloride, an alkyl ester sulfonate, an alkyl ether sulfonate, an alkyl ether sulfate, an alkali metal alkyl sulfate, an alkyl sulfonate, an alkylaryl sulfonate, a sulfosuccinate, an alkyl disulfonate, an alkylaryl disulfonate, an alkyl disulfate, an alcohol polypropoxylated sulfate, an alcohol polyethoxylated sulfateany derivative thereof, or any combination thereof.

Suitable zwitterionic surfactants may include, but are not limited to, an alkyl amine oxide, an alkyl betaine, an alkyl arnidopropyl betaine, an alkyl sulfobetaine, an alkyl sultaine, a dihydroxyl alkyl glycinate, an alkyl ampho acetate, a phospholipid, an alkyl aminopropionic acid, an alkyl imino monopropionic acid, an alkyl imino dipropionic acid, dipalmitoyl-phosphatidylcholine, an amine oxide, a betaine, a modified betaine, an alkylamidobetaine (e.g., cocoamidopropyl betaine), and any combination thereof.

As example, surfactants that may exhibit viscoelastic properties may include, but are not limited to, a sulfosuccinate, a taurate, an amine oxide (e.g., an amidoamine oxide), an ethoxylated amide, an alkoxylated fatty acid, an alkoxylated alcohol, an ethoxylated fatty amine, an ethoxylated alkyl amine, a betaine, modified betaine, an alkylamidobetaine, a quaternary ammonium compound, an alkyl sulfate, an alkyl ether sulfate, an alkyl sulfonate, an ethoxylated ester, an ethoxylated glycoside ester, an alcohol ether, any derivative thereof, and any combination thereof.

Suitable sulfonates for use as a dispersant according to the embodiments described herein may include, but are not limited to, a melamine sulfonate condensed with formaldehyde, a sulfonated styrene maleic anhydride copolymer, a sulfonated vinyl toluene maleic anhydride copolymer, a sodium naphthalene sulfonate condensed with formaldehyde, a sulfonated acetone condensed with formaldehyde, an interpolymer of acrylic acid, an allyloxybenzene sulfonate, an allyl sulfonate, and any combination thereof.

Suitable commercially available examples of dispersants for use in the methods of the present disclosure may include, but are not limited to, CFR®2, CFR®3, CFR®5LE, CFR®6, CFRC®8, THERMA-FLOW 500™, BARAFOS®, BARATHIN-PLUS®, ENVIRO-THIN™, LIGNOX®, QUIK-THIN®, THERMA-THIN®, AQUA-CLEAR® PFD, INVERMUL® NT, EZ MUL®, COLDTROL®, ATC®, and FACTANT®, each available from Halliburton Energy Services, Inc. in Houston, Tex.

In some embodiments, the dispersant(s) may be included in the grout additive control packages of the present disclosure in an amount to achieve a range of from a lower limit of about 0.001%, 0.05%, 0.1%, 0.15%, 0.2%, 0.25%, 0.3%, 0.35%, 0.4%, 0.45%, and 0.5% to an upper limit of about 1%, 0.95%, 0.9%, 0.85%, 0.8%, 0.75%, 0.7%, 0.65%, 0.6%, 0.55%, and 0.5% by weight of the final grout fluid, encompassing any value and subset therebetween. Each of these values is critical to the methods of the present disclosure and may depend on a number of factors including, but not limited to, the amount and composition of the grout additive control package, the amount and type of the aqueous swellable clay(s), conditions of the subterranean formation, and the like.

Another primary additive that may be included in the grout additive control packages of the present disclosure may include a thermally conductive material. The thermally conductive material may be used to enhance the set final grout fluids ability to conduct heat, and thus the ability of the geothermal well loop to conduct heat during operation. Suitable thermally conductive materials may include, but are not limited to, graphite, sand, quartz silica, a carbon nanotube, graphene, boron nitride, brass, a brass alloy, chrome nickel steel, carbon steel, stainless steel, a transition metal (e.g., copper, cadmium, cobalt, gold, silver, iridium, iron, molybdenum, nickel, platinum, zinc, and the like), a transition metal alloy (e.g., a copper alloy, a cadmium alloy, a cobalt alloy, a gold alloy, a silver alloy, an iridium alloy, an iron alloy, a molybdenum alloy, a nickel alloy, a platinum alloy, a zinc alloy, and the like), a post-transition metal (e.g., lead, tin, and the like), a post-transition metal alloy (e.g., an lead alloy, a tin alloy, and the like), an alkaline earth metal alloy (e.g., a beryllium alloy, a magnesium alloy, and the like), and any combination thereof.

In some embodiments, the thermally conductive material may be present in the final grout fluids of the present disclosure in an amount sufficient to provide the desired amount of thermal conductivity to a particular geothermal well loop and set final grout fluid. In some embodiments, the thermally conductive material may be present in the grout additive control packages to achieve a range of from a lower limit of about 5%, 7.5%, 10%, 12.5%, 15%, 17.5%, 20%, 22.5%, 25%, 27.5%, 30%, 32.5%, 35%, 37.5%, and 40% to an upper limit of about 75%, 72.5%, 70%, 67.5%, 65%, 62.5%, 60%, 57.5%, 55%, 52.5%, 50%, 47.5%, 45%, 42.5%, and 40% by weight of the final grout fluid, encompassing any value and subset therebetween. Each of these values is critical and may depend, at least one part, on the amount and composition of the grout additive control package, the amount and type of the aqueous swellable clay(s), conditions of the subterranean formation, and the like.

In some embodiments, the thermally conductive material may be the grout additive control packages such that the set final grout fluid possesses a thermal conductivity in the range of a lower limit of about 0.4 British Thermal Unit per foot per hour per Fahrenheit degree (BTU/hr·ft·° F.), 0.6 BTU/hr·ft·° F., 0.8 BTU/hr·ft·° F., 1.0 BTU/hr·ft·° F., 1.2 BTU/hr·ft·° F., 1.4 BTU/hr·ft·° F., 1.6 BTU/hr·ft·° F., 1.8

BTU/hr·ft·° F., 2.0 BTU/hr·ft·° F., and 2.2 BTU/hr·ft·° F. to an upper limit of about 4.0 BTU/hr·ft·° F., 3.8 BTU/hr·ft·° F., 3.6 BTU/hr·ft·° F., 3.4 BTU/hr·ft·° F., 3.2 BTU/hr·ft·° F., 3.0 BTU/hr·ft·° F., 2.8 BTU/hr·ft·° F., 2.6 BTU/hr·ft·° F., 2.4 BTU/hr·ft·° F., and 2.2 BTU/hr·ft·, ° F., encompassing any value and subset therebetween. Each of these values is critical to the methods of the present disclosure and may depend on a number of factors including, but not limited to, the degree of thermal conductivity desired, the amount and composition of the grout additive control package, the amount and type of the aqueous swellable clay(s), conditions of the subterranean formation, and the like.

The final grout fluids of the present disclosure further comprise an aqueous swellable clay. In some embodiments, the aqueous swellable clay may be substantially insoluble in the presence of an aqueous fluid, such as the fresh water base fluid of the present disclosure. As used herein, the term "substantially insoluble" means that no more than about 1 part of the aqueous swellable clay dissolves in 100 parts of the fresh water base fluid. Suitable aqueous swellable clays for use in the methods of the present disclosure may include, but are not limited to, a member of the smectite family, a member of the palygorskite-sepiolite phyllosilicate family, a member of the kaolinite-serpentine family, nontronite, bentonite, hectorite, attapulaite, fluoromica, montmorillonite, beidellite, saponite, sepiolite, kaolinite, illite, any cation exchanged version thereof, and any combination thereof.

Of the suitable smectite family clays including nontronite, montmorillonite, saponite, hectorite, and beidellite, other suitable smectite family clays for use as the aqueous swellable clays of the present disclosure may include, but are not limited to, aliettite, ferrosaponite, sauconite, stevensite, swinefordite, volkonskoite, yakhontovite, and any combination thereof. Suitable members of the palygorskite-sepiolite pyhyllosilicate family may include, but are not limited to, attapulgite, tuperssautsiaite, windhoekite, yofortierite, falcondoite, ferrisepiolite, loughlinite, and any combination thereof. Suitable members of the kaolinite-serpentine family of aqueous swellable clays may include, but are not limited to, kaolinite, greenalite, fraipontite, halloysite, dickite, lizardite, manandonite, nacrite, cronstedtite, clinochrysotile, chrysotile, nepouite, odinite, webskyite, pecoraite, orthochrysotile, parachrysotile, caryopilite, brindleyite, berthierine, amesite, antigorite, baumite, and any combination thereof.

In some embodiments, the aqueous swellable clay(s) may be present in the final grout fluids of the present disclosure in an amount in the range of a lower limit of about 5%, 6%, 7%, 8%, 9%, 10%, 11%, 12%, 13%, 14%, 15%, 16%, 17%, 18%, 19%, 20%, 21%, and 22% to an upper limit of about 40%, 39%, 38%, 37%, 36%, 35%, 349/o, 33%, 32%, 31%, 30%, 29%, 28%, 27%, 26%, 25%, 24%, 23%, and 22% by weight of the final grout fluid, encompassing any value and subset therebetween. In some embodiments, the aqueous swellable clay(s) may be present in the final grout fluid to achieve a density in the range of from a lower limit of about 1070 kilograms per cubic meter (kg/m$^3$), 1090 kg/m$^3$, 1110 kg/m$^3$, 1130 kg/m$^3$, 1150 kg/m$^3$, 1170 kg/m$^3$, 1190 kg/m$^3$, 2110 kg/m$^3$, 2130 kg/m$^3$, 2150 kg/m$^3$, and 2170 kg/m$^3$ to an upper limit of about 1450 kg/m$^3$, 1430 kg/m$^3$, 1410 kg/m$^3$, 1390 kg/m$^3$, 1370 kg/m$^3$, 1350 kg/m$^3$, 1330 kg/m$^3$, 1310 kg/m$^3$, 1290 kg/m$^3$, and 1270 kg/m$^3$, encompassing any value and subset therebetween. Each of the previous values is critical to the methods of the present disclosure and may depend on a number of factors including, but not limited to, the amount and composition of the grout additive control package, the amount and type of the aqueous swellable clay(s), conditions of the subterranean formation, and the like.

In some embodiments, the grout additive control package may comprise, in addition to the one or more primary additives, one or more secondary additives, each of which is optional depending on the desired function of the set final grout fluid. The secondary additives may be used to further refine the thermal conductivity of the set final grout fluid and/or the structural integrity of the set final grout fluid, among other things. In some embodiments, the optional, secondary additives for use in the grout additive control packages of the present disclosure may be a thermally insulative material, a cementitious material, and any combination thereof. The secondary additives may be suspendable in the fresh water base fluid and not dissolvable, as defined herein, or may have a portion of soluble intermediates that undergo a complex chain of reactions that result in a fully solid material at the conclusion of the reactions. For example, while a cementitious material may hydrate with water and release a portion of its mass as fully dissolved species during the early phases of the cement reaction, these species will react with suspended cement particles and eventually combine to form a solidified body of cement. Additionally, the thermally insulative material for use as the secondary additives described herein is suspendable in the fresh water base fluid and typically not dissolvable.

The thermally insulative material may be included in the grout additive control package to fine tune the thermal conductivity of the set final grout fluid, such as by counteracting a portion of the thermally conductive material, if included, in the grout additive control package. The thermally insulative material may also be desirable in particularly hot climates where the geothermal well loop is to be installed in a subterranean formation, or where it may be desirable to maintain cool temperatures. For example, shallow geothermal well loops may have sections thereof that may be manipulated to maintain cooler temperatures than would otherwise be possible at all areas of the loop (e.g., in deeper sections of the geothermal well loop). Suitable thermally insulative materials may be solid particles that have low thermal conductivity. Specific examples of suitable thermally insulative materials for use in the grout additive control packages of the present disclosure may include, but are not limited to, glass (e.g., glass spheres), diatomaceous earth, polyurethane, polyurethane foam, polystyrene, perlite, fiberglass, cork, wood, straw, rock wool, mineral wool, cellulose, and any combination thereof. A suitable commercially available thermally insulative material may include, but is not limited to, 3M™ GLASS BUBBLES, available from 3M in Saint Paul, Minn.

The amount of thermally insulative material included in the grout additive control packages may be critical upon the desired amount of thermal insulation, the remaining amount and composition of the grout additive control package, the amount and type of the aqueous swellable clay(s), conditions of the subterranean formation, and the like, and may be in the range of from a lower limit of about 5%, 5.5%, 6%, 6.5%, 7%, 7.5%, 8%, 8.5%, 9%, 9.5%, 10%, 10.5%, 11%, 11.5%, 12%, and 12.5% to an upper limit of about 20%, 19.5%, 19%, 18.5%, 18%, 17.5%, 17%, 16.5%, 16%, 15.5%, 15%, 14.5%, 14%, 13.5%, 13%, and 12.5% by weight of the final grout fluid, encompassing any value and subset therebetween. The amount of thermally insulative material may also be included to achieve the desired thermal conductivity values for the final grout fluid, as described above.

A cementitious material may also be included as a secondary additive to the grout additive control packages of the present disclosure to provide structural integrity (e.g., integrity) to the set final grout fluid surrounding a geothermal well loop tubular in a subterranean formation. The cementitious material of the embodiments herein may be any cementitious material suitable for use in subterranean operations, including, but not limited to, a hydraulic cement, a non-hydraulic cement, and any combination thereof. Hydraulic cements harden by the process of hydration due to chemical reactions to produce insoluble hydrates (e.g., calcium hydroxide) that occur independent of the cement's water content (e.g., hydraulic cements can harden even under constantly damp conditions). Thus, hydraulic are capable of hardening regardless of the water content of a particular subterranean formation. Suitable hydraulic cements may include, but are not limited to Portland cement, Portland cement blends (e.g., Portland blast-furnace slag cement, expansive cement, and the like), non-Portland hydraulic cement (e.g., super-sulfated cement, calcium aluminate cement, high magnesium-content cement, and the like), and any combination thereof. Suitable non-hydraulic cements may include, but are not limited to, slaked lime, gypsum plaster, lime plaster, and any combination thereof.

When included in the grout additive control packages described herein, the cementitious material may be present in the range of from a lower limit of about 1%, 2%, 3%, 4%, 5%, 6%, 7%, 8%, 9%, and 10% to an upper limit of about 20%, 19%, 18%, 17%, 169/o, 15%, 14%, 13%, 12%, 11%, and 10% by weight of the final grout fluid, encompassing any value and subset therebetween.

Each of these values is critical and the range or value of cementitious material may depend, at least in part, on the desired structural characteristics of the set final grout fluid (e.g., shear strength, permeability, and the like), the remaining amount and composition of the grout additive control package, the amount and type of the aqueous swellable clay(s), conditions of the subterranean formation, and the like.

In various embodiments, systems configured for delivering the final grout fluid of the present disclosure to a downhole location are described. In various embodiments, the systems may comprise a pump fluidly coupled to a tremie line (or simply "tremie"). As used herein, the term "tremie line" or "tremie" refers to a tubular (e.g., a pipe) through which concrete is placed into a subterranean formation. The interior of the tremie line may contain the final grout fluid of the present disclosure to be deposited into an annulus in a subterranean formation comprising a geothermal well loop therein, such that the final grout is placed in the annulus between the subterranean formation and the geothermal well loop. The end of the tremie line that is not connected to the pump allows the grout fluid to exit the interior for placement.

The pump may be a high pressure pump in some embodiments.

As used herein, the term "high pressure pump" will refer to a pump that is capable of delivering the final grout fluid at a pressure of about 1000 psi or greater. In some embodiments, the high pressure pump may be desirable where such rates to not induce fracturing in the subterranean formation or unnecessary stresses on the geothermal well loop, but the final grout fluid sets in a relatively quick amount of time. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, although not required, a low pressure pump may be fluidly coupled to a high pressure pump that is fluidly coupled to the tremie. That is, in such embodiments, the low pressure pump may be configured to convey the final grout fluid to the high pressure pump. In such embodiments, the low pressure pump may "step up" the pressure of the fluids before reaching the high pressure pump.

In some embodiments, the systems described herein may further comprise a mixing tank that is upstream of the pump and in which the final grout fluid are formulated. In various embodiments, the pump (e.g., a low pressure pump, a high pressure pump, or a combination thereof) may convey the final grout fluid from the mixing tank or other source of the final grout fluid to the tremie. In other embodiments, however, the final grout fluid may be formulated offsite and transported to a worksite, in which case the final grout fluid may be introduced to the tremie via the pump directly from its shipping container (e.g., a truck, a railcar, a barge, or the like) or from a transport pipeline. In either case, the final grout fluid may be drawn into the pump, elevated to an appropriate pressure, and then introduced into the tremie for delivery into the annulus.

Referring now to FIG. 1, illustrated is a schematic of a system that can deliver the final grout fluid of the present disclosure to a downhole location for grouting a geothermal well loop, according to one or more embodiments. As depicted in FIG. 1, system 1 may include mixing tank 10, in which the final grout fluids of the embodiments herein may be formulated. The final grout fluids may be conveyed via line 12 to pump 20, and finally to tremie line 16 extending into a wellbore 22 in a subterranean formation 18. The tremie line extends into an annulus 14 formed between the subterranean formation 18 and a geothermal well loop 24. The geothermal well loop 24 may be a loop with a u-shaped bottom, an S-configuration, an infinity-shaped configuration, or any other configuration capable of forming a continuous tubular for circulating fluid therein to provide cooling and/or heating, as described above. The geothermal well loop 24 may be connected to a circulating pump and/or heating and cooling equipment at the surface above the subterranean formation 18.

In use, in some embodiments, a final grout fluid exits the bottom of the tremie line 16 and the tremie line 16 remains submerged several feet (between about one and three feet) below the level of the final grout fluid. As the level of the final grout fluid rises in the annulus 14, the tremie line 16 may be withdrawn at approximately the same rate as the final grout fluid is being pumped into the annulus 14 with the pump 20.

While FIG. 1 depicts introducing the final grout fluid into an annulus to grout a geothermal well loop in a subterranean formation, other methods may also be employed without departing from the scope of the present disclosure. For example, a displacement method may be utilized where the final grout fluid is first introduced into a subterranean formation followed by setting the geothermal well loop therein, which displaces the final grout fluid. In other examples, an inner-string method of placing the final grout fluid may be used where a cementing float shoe is attached to the bottom of a pipe for forming the geothermal well loop before it is sealed and a tremie line is lowered until it engages the shoe, injecting the final grout fluid into the annulus with the tremie line within the pipe. In other embodiments, a casing method of grouting may be utilized where the final grout fluid is placed in a pipe for forming the geothermal well loop before it is sealed and the final grout fluid is then forced out of the bottom of the pipe and into the annulus. Other methods may also be employed, without departing from the scope of the present disclosure.

Embodiments Disclosed Herein Include

Embodiment A

A method comprising: (a) first, preparing a grout additive fluid comprising a fresh water base fluid and a grout additive control package comprising a primary additive selected from the group consisting of an inhibitor, a dispersant, a thermally conductive material, and any combination thereof, wherein at least about 90% of the dispersant and the inhibitor are dissolved in the fresh water base fluid; (b) second, introducing an aqueous swellable clay into the grout additive fluid, thereby forming a final grout fluid; and (c) third, introducing the final grout fluid into an annulus in a subterranean formation, the annulus formed between an exterior of a geothermal well loop tubular and the subterranean formation.

Embodiment B

A method comprising: (a) first, preparing a grout additive fluid comprising a fresh water base fluid and a grout additive control package comprising a primary additive selected from the group consisting of an inhibitor, a dispersant, a thermally conductive material, and any combination thereof, wherein at least about 90% of the dispersant and the inhibitor are dissolved in the fresh water base fluid; (b) second, introducing an aqueous swellable clay into the grout additive fluid, thereby forming a final grout fluid, wherein the inhibitor is present in an amount in the range of from about 0.001% to about 5% by weight of the final grout fluid, wherein the dispersant is present in an amount in the range of from about 0.001% to about 1% by weight of the final grout fluid, wherein the thermally conductive material is present in an amount in the range of from about 5% to about 75% by weight of the final grout fluid, and wherein the aqueous swellable clay is present in an amount in the range of from about 5% to about 40% by weight of the final grout fluid; and (c) third, introducing the final grout fluid into an annulus in a subterranean formation, the annulus formed between an exterior of a geothermal well loop tubular and the subterranean formation.

Each of Embodiment A and Embodiment B may have one or more of the following additional elements in any combination:

Element 1: Wherein the aqueous swellable clay is natural or synthetic, and selected from the group consisting of a member of the smectite family, a member of the palygorskite-sepiolite phyllosilicate family, a member of the kaolinite-serpentine family, nontronite, bentonite, hectorite, attapulgite, fluoromica, montmorillonite, beidellite, saponite, sepiolite, kaolinite, illite, any cation exchanged version thereof, and any combination thereof.

Element 2: Wherein the inhibitor is selected from the group consisting of a salt comprising a cation and an anion, a polymer, a silicate, a partially hydrolyzed polyvinyl acetate, a polyacrylamide, a partially hydrolyzed polyacrylamide, a polyalkylene glycol, a polyalkylene alcohol, a polyalkylene alkoxylate, a polyalkylene oligomer, a polyalkylene polymer, a polyalkylene copolymer, a cationic oligomer or polymer, an acid, a potassium salt, an ammonium salt, a sodium salt, an iron salt, an aluminum salt, a phosphonium salt, polyaminopolyamide-epichlorohydrin resin, dial lydimethylammonium chloride, polydiallyldimethylammonium chloride, aminoethylethanolamine, diethylenetriamine, triethylenetetramine, diethanolamine, triethanolamine, polyvinyl pyrrolidone, potassium silicate, potassium carbonate, tribasic potassium phosphate, and any combination thereof.

Element 3: Wherein the inhibitor is a salt comprising a cation and an anion, and the cation is selected from the group consisting of lithium, potassium, sodium, hydronium, ammonium, calcium, magnesium, a quaternary amine, magnesium, calcium, strontium, barium, titanium, cesium, vanadium, chromium, manganese, iron, cobalt, nickel, copper, zinc, aluminum, zirconium, and any combination thereof; and wherein the anion is selected from the group consisting of chloride, bromide, nitrate, iodide, hydroxide, nitirite, hexafluoroantimonate hexafluoroarsenate, hexafluorophosphate, propionate, lactate, tartrate, phosphate, phosphonium, borate, silicate, sulfate, acetate, aluminate, chromate, dichromate, permanganate, chlorate and perchlorate, formate, and any combination thereof.

Element 4: Wherein the inhibitor is a cationic oligomer or polymer comprising at least one monomer selected from the group consisting of imine, alkylene imine, ethylene imine, propylene imine, amine, ethylene amine, an organo-amine, a quaternary amine, acrylamide, methacrylamide, putresine, cadaverine, spermidine, spermine, diethylenetriamine, tetramethylenediamine, triethylenetetramine, tetraethylenepentamine, diallyldimethylammonium chloride, (2-methacryloyloxyethyl) trimethyl ammonium chloride, vinyl pyrrolidone, any derivative thereof, any salt thereof, and any combination thereof.

Element 5: Wherein the dispersant is selected from the group consisting of consisting of derivatives of an acid, salts of derivatives of an acid, phosphates, sodium carbonates, polymeric sodium silicate complexes, monomeric sodium silicate complexes, lignite compounds, and low molecular weight polymers, soaps, surfactants, sulfonates, and any combination thereof.

Element 6: Wherein the thermally conductive material is selected from the group consisting of graphite, sand, quartz silica, a carbon nanotube, graphene, boron nitride, brass, a brass alloy, chrome nickel steel, carbon steel, stainless steel, a transition metal, a transition metal alloy, a post-transition metal, a post-transition metal alloy, an alkaline earth metal, an alkaline earth metal alloy, and any combination thereof.

Element 7: Wherein the grout additive control package further comprises a secondary additive selected from the group consisting of a thermally insulative material, a cementitious material, and any combination thereof.

Element 8: Wherein the grout additive control package further comprises a secondary additive selected from the group consisting of a thermally insulative material, a cementitious material, and any combination thereof, and wherein the thermally insulative material is a particulate composed of a material selected from the group consisting of glass, diatomaceous earth, polyurethane, polyurethane foam, polystyrene, perlite, fiberglass, cork, wood, straw, rock wool, mineral wool, cellulose, and any combination thereof.

Element 9: Wherein the grout additive control package further comprises a secondary additive selected from the group consisting of a thermally insulative material, a cementitious material, and any combination thereof, and wherein the cementitious material is selected from the group consisting of a hydraulic cement, a non-hydraulic cement, and any combination thereof.

Element 10: Further comprising hydrating the final grout fluid to a viscosity in the range of from about 20 cP to about 500 cP prior to step (c).

Element 11: Further comprising (d) setting the final grout fluid.

Element 12: Further comprising (d) setting the final grout fluid, and wherein the set final grout fluid has a low permeable hydraulic seal of less than about $1 \times 10^{-7}$ cm/s.

Element 13: Further comprising a tremie extending into the annulus in the subterranean formation and a pump fluidly coupled to the tremie, wherein step (c) includes introducing the final grout fluid into the annulus through the tremie.

By way of non-limiting example, exemplary combinations applicable to Embodiment A and Embodiment B include: 1 and 5; 4, 6, 9, and 13; 1, 2, 3, 4, 5, 6, 7, 8, 9, 10, 11, 12, and 13; 2, 7, 10, and 11; 3, 5, and 12; and the like.

To facilitate a better understanding of the embodiments of the present invention, the following examples of preferred or representative embodiments are given. In no way should the following examples be read to limit, or to define, the scope of the invention.

Example 1

In this example, two grout fluids were prepared. Grout B was prepared according to the traditional method described above of dry blending additives including an ammonium salt inhibitor, a sodium polyphosphate dispersant and an industrial-grade sodium bentonite aqueous swellable clay, followed by hydration using a low shear paddle mixer at 1100 revolutions per minute (rpm) for 1.5 minutes (min) in deionized water (DI water), followed by addition of a 50-70 mesh graphite thermally conductive material. Grout A was prepared according to the sequential series of steps described in accordance with the embodiments described herein by first dry blending the same amount and type of inhibitor, dispersant, and graphite thermally conductive material; hydrating the dry blended additives in DI water for 1 min at low shear; and finally adding the industrial-grade bentonite aqueous swellable clay to the mixture followed by hydration thereof at low shear for 1.5 min. The formulation of Grout A and Grout B are provided in Table 1 below.

TABLE 1

| COMPONENT | GROUT A | GROUT B |
| --- | --- | --- |
| Inhibitor (grams) | 3.95 | 3.95 |
| Dispersant (grams) | 0.61 | 0.61 |
| Thermally Conductive Material (grams) | 50.00 | 50.00 |
| Aqueous Swellable Clay (grams) | 71.26 | 71.26 |
| DI water (milliliters) | 350.00 | 350.00 |

The rheological properties of Grout A and Grout B were evaluated using a FANN® 35A Viscometer at ambient temperature using an installed R1 rotor sleeve, B1 bob, and F1 torsion spring by measuring the shear stress of the bob at a shear rate of 300 rpm (units: centipoise (cP)) over a period of five minutes. The 10 minute (min) gel strength was measured by allowing Grout A and Grout B to remain static for 10 min, followed by measuring the maximum deflection at 3 rpm with the FANN® 35A Viscometer (units: lb/100 ft$^2$). The rheology results are reported in Table 2 below.

TABLE 2

| | GROUT A | GROUT B |
| --- | --- | --- |
| 300 rpm, time = 0 min (cP) | 30.0 | 86.0 |
| 300 rpm, time = 1 min (cP) | 29.5 | 85.0 |
| 300 rpm, time = 2 min (cP) | 30.0 | 85.5 |
| 300 rpm, time = 3 min (cP) | 30.0 | 86.0 |
| 300 rpm, time = 4 min (cP) | 30.0 | 88.0 |
| 300 rpm, time = 5 min (cP) | 30.5 | 91.0 |
| 10 min gel (lb/100 ft$^2$) | 34.0 | 106.0 |

As shown, after five minutes of mixing on the viscometer at 300 rpm, the viscosity of Grout B is nearly three times greater than that of Grout A. Similarly, the 10 minute gel strength of Grout B is nearly three times greater than that of Grout A. These properties are observed despite having the same amount and type of additives and aqueous swellable clay included in both grouts, demonstrating the importance of the sequential series of steps described in the present disclosure.

Example 2

In this example, five grout fluids (Grouts C-G) were prepared using the sequential steps described in Example 1 and using the same inhibitor, dispersant, thermally conductive material, and aqueous swellable clay as in Example 1. The loadings of DI water and aqueous swellable clay was held constant and the various additives were varied in quantity to evaluate the response of each grout fluid. Each of Grouts C-G were prepared according to Table 3 below.

TABLE 3

| COMPONENT | GROUT C | GROUT D | GROUT E | GROUT F | GROUT G |
| --- | --- | --- | --- | --- | --- |
| Inhibitor (grams) | 1.29 | 1.58 | 2.00 | 2.58 | 3.15 |
| Dispersant (grams) | 0.22 | 0.27 | 0.34 | 0.43 | 0.53 |
| Thermally Conductive Material (grams) | 45.00 | 55.00 | 70.00 | 90.00 | 110.00 |
| Aqueous Swellable Clay (grams) | 78.00 | 78.00 | 78.00 | 78.00 | 78.00 |
| DI water (milliliters) | 350.00 | 350.00 | 350.00 | 350.00 | 350.00 |

The rheological properties of each of Grouts C-G were evaluated as described in Example 1. The shear strength of Grouts C-G was also evaluated at a time between 18 and 24 hours using the American Petroleum Institute (API) Recommended Practice (RP) 13B-2, 5$^{th}$ ed. (2014), Appendix A—Measurement of Shear Strength Using Shearometer Tube (units: lb/100 ft$^2$). Additionally, each of Grouts C-G were evaluated over an industrially relevant range of thermal conductivities using a KD2-PRO® Thermal Properties Analyzer equipped with a TR-1 Sensor Kit, available from Decagon Devices, Inc. in Pullman, Wash. (units: BTU/hr·ft·° F.). The results are reported in Table 4 below.

TABLE 4

| | GROUT C | GROUT D | GROUT E | GROUT F | GROUT G |
| --- | --- | --- | --- | --- | --- |
| 300 rpm, time = 0 min (cP) | 147.0 | 130.0 | 103.0 | 93.0 | 86.0 |
| 300 rpm, time = 1 min (cP) | 150.0 | 132.0 | 108.0 | 99.0 | 91.5 |
| 300 rpm, time = | 160.0 | 148.0 | 118.0 | 109.0 | 98.0 |

TABLE 4-continued

|  | GROUT C | GROUT D | GROUT E | GROUT F | GROUT G |
|---|---|---|---|---|---|
| 2 min (cP) |  |  |  |  |  |
| 300 rpm, time = 3 min (cP) | 176.0 | 161.0 | 130.0 | 122.0 | 103.5 |
| 300 rpm, time = 4 min (cP) | 189.0 | 176.0 | 145.0 | 130.0 | 108.0 |
| 300 rpm, time = 5 min (cP) | 203.0 | 191.0 | 158.0 | 138.0 | 118.0 |
| 10 min gel (lb/100 ft$^2$) | 210.0 | 145.0 | 140.0 | 93.0 | 82.0 |
| Shear Strength (lb/100 ft$^2$) | 380 | 280 | 360 | 310 | 310 |
| Thermal Conductivity (BTU/hr · ft. · ° F.) | 1.059 | 1.204 | 1.352 | 1.531 | 2.585 |

As shown, as more of the graphite thermally conductive material was added to the grout fluid, the viscosity and gel strength was reduced. Additionally, although the viscosity of Grouts C-G vary, the range of applicable pumping equipment for use in a method of grouting a geothermal well loop is enhanced because the viscosities remain below about 500 cP, and in most instances as shown in Table 4, substantially below about 500 cP. Over the five minutes of mixing at 300 rpm, the viscosity increases from 38%-53%, ensuring hydration takes place at a predictable rate during a typical placement time of the grout fluid of about 2-3 minutes. The shear strength additionally remained relatively stable between each of Grouts C-G, ranging from 280 lb/100 ft$^2$ to 380 lb/100 ft$^2$.

Example 3

In this example, four grout fluids (Grouts H-K) were prepared using various qualities of bentonite aqueous swellable clays using the sequential steps described in Example 1 and in accordance with the methods of the present disclosure. Each of an industrial grade bentonite (as was used in Examples 1 and 2), a high grade bentonite, an OCMA grade bentonite, and a low grade bentonite were used to formulate Grouts H-K, as shown in Table 5 below.

TABLE 5

| COMPONENT | GROUT H | GROUT I | GROUT J | GROUT K |
|---|---|---|---|---|
| Inhibitor grams | 3.15 | 3.15 | 3.15 | 3.15 |
| Dispersant (grams) | 0.53 | 0.53 | 0.53 | 0.53 |
| Thermally Conductive Material (grams) | 110.00 | 110.00 | 110.00 | 110.00 |
| Industrial Grade Bentonite (Aqueous Swellable Clay) (grams) | 78.00 | — | — | — |
| High Grade Bentonite (Aqueous Swellable Clay) (grams) | — | 78.00 | — | — |
| OCMA Bentonite (Aqueous Swellable Clay) (grams) | — | — | 78.00 | — |
| Low Grade Bentonite (Aqueous Swellable Clay) (grams) | — | — | — | 78.00 |
| DI water (milliliters) | 350.00 | 350.00 | 350.00 | 350.00 |

The rheological properties, 10 minute gel strength, shear strength, and thermal conductivity of each of Grout H-K were determined according to the methods described in Examples 1 and 2, except that for the rheological properties, the FANN® 35A Viscometer was equipped with a R1 rotor sleeve, B1 bob, and F5 torsion spring. The results are reported in Table 6 below.

TABLE 6

|  | GROUT H | GROUT I | GROUT J | GROUT K |
|---|---|---|---|---|
| 300 rpm, time = 0 min (cP) | 86.0 | 305.0 | 195.0 | 28.0 |
| 300 rpm, time = 1 min (cP) | 91.5 | 385.0 | 210.0 | 31.0 |
| 300 rpm, time = 2 min (cP) | 98.0 | 410.0 | 230.0 | 32.5 |
| 300 rpm, time = 3 min (cP) | 103.5 | 430.0 | 240.0 | 33.5 |
| 300 rpm, time = 4 min (cP) | 108.0 | 465.0 | 255.0 | 36.0 |
| 300 rpm, time = 5 min (cP) | 118.0 | 490.0 | 265.0 | 39.0 |
| 10 min gel (lb/100 ft$^2$) | 82.0 | 330.0 | 175.0 | 30.0 |
| Shear Strength (lb/100 ft$^2$) | 306 | >5000 | 277 | 79 |
| Thermal Conductivity (BTU/hr · ft. · ° F.) | 2.585 | 2.642 | 3.109 | 2.697 |

As shown, it is clear that the industrial and OCMA grades of bentonite grout fluids (Grouts H and J) are readily pumpable with acceptable shear strengths. The high grade bentonite used in Grout I demonstrated higher viscosities, which would require high pump rates (e.g., pumps capable of such high pump rates) for placement of the grout in a subterranean formation. The low grade bentonite used in Grout K exhibited much reduced viscosity compared to the other grout fluids and may require additional viscosification in order to adequately exhibit carrying capacity needed to place the thermally conductive material substantially uniformly throughout the annulus around a geothermal well loop. Additionally, the low shear strength of Grout K may also pose a problem for uniform suspension and placement of the thermally conductive material.

Example 4

In this example, four grout fluids (Grouts L-O) were prepared according to Example 1 and in accordance with the sequential methods of the present disclosure. However, differing thermally conductive material (quartz silica sand) was used in some of the grout fluid formulations. Additionally, each of the grout fluids may further include a secondary additive (in addition to the primary additive). These secondary additives include cementitious material, and glass bubble thermally insulative material. The cementitious material comprised American Society for Testing Materials (ASTM) Type I/II Construction Grade cement and 3™ GLASS BUBBLES. Each of the grout fluids was formulated according to Table 7 below.

TABLE 7

| COMPONENT | GROUT L | GROUT M | GROUT N | GROUT O |
|---|---|---|---|---|
| Inhibitor grams | 3.15 | 3.15 | 3.15 | 3.15 |
| Dispersant (grams) | 0.53 | 0.53 | 0.53 | 0.53 |
| Graphite Thermally Conductive Material (grams) | — | — | 110.0 | — |
| Sand Thermally Conductive Material (grams) | 200.00 | 532.00 | — | — |
| Cementitious Secondary Additive (grams) | — | — | 20.00 | — |
| Glass Bubble Thermally Insulative Material | — | — | — | 50.00 |
| Industrial Grade Bentonite (Aqueous Swellable Clay) (grams) | 78.00 | 78.00 | 78.00 | 78.00 |
| DI water (milliliters) | 350.00 | 350.00 | 350.00 | 350.00 |

The rheological properties, 10 minute gel strength, shear strength, and thermal conductivity of each of Grout H-K were determined according to the methods described in Examples 1 and 2. The results are reported in Table 8 below.

TABLE 8

|  | GROUT L | GROUT M | GROUT N | GROUT O |
|---|---|---|---|---|
| 300 rpm, time = 0 min (cP) | 65.0 | 200.0 | 115.0 | 135.0 |
| 300 rpm, time = 1 min (cP) | 115.0 | 345.0 | 152.5 | 142.5 |
| 300 rpm, time = 2 min (cP) | 140.0 | 455.0 | 160.0 | 147.5 |
| 300 rpm, time = 3 min (cP) | 160.0 | 500.0 | 167.5 | 150.0 |
| 300 rpm, time = 4 min (cP) | 172.5 | 555.0 | 175.0 | 152.0 |
| 300 rpm, time = 5 min (cP) | 175.0 | 610.0 | 185.0 | 167.5 |
| 10 min gel (lb/100 ft$^2$) | 120.0 | 245.0 | 70.0 | 220.0 |
| Shear Strength (lb/100 ft$^2$) | 106 | 405 | 3683 | 342 |
| Thermal Conductivity (BTU/hr · ft · ° F.) | 0.682 | 1.034 | 1.412 | 0.259 |

As shown, Grouts L and M with the sand thermally conductive material loadings provide thermal conductivities of about 0.7 BTU/hr·ft·° F. and about 1.0 BTU/hr·ft·° F., respectively. Grout L produces an easily pumpable grout fluid but may not exhibit a desirable shear strength. Grout M, however, produced a much more viscous grout fluid and a significantly higher shear strength due to the increased loading of the sand required to achieve a higher thermal conductivity. In cases where very high shear strength and/or compressive strength is needed, the addition of the cementitious material secondary additive, as included in Grout N, may be used, which is apparent from the high shear strength of 3683 lb/100 ft$^2$. Of course, the cementitious material secondary additive could also be included with a non-graphite thermally conductive material (e.g., sand, and the like), without departing from the scope of the present disclosure. Grout O includes a thermally insulative material, 3M™ GLASS BUBBLES. As shown, the thermally insulative material, having a thermal conductivity of 0.259 BTU/hr·ft·° F. is considerable less than the thermal conductivity values of Grouts L-N that do not include a thermally insulative material. The formulation used in Grout K exhibited several viscosity readings greater than 500 cP, which may be the result of the amount of sand thermally conductive material included in the formation. Grout M may thus require one or more high-pressure pump in order to adequately place the grout into a formation.

Therefore, the embodiments disclosed herein are well adapted to attain the ends and advantages mentioned as well as those that are inherent therein. The particular embodiments disclosed above are illustrative only, as they may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
   (a) first, preparing a grout additive fluid comprising a fresh water base fluid and a grout additive control package comprising a primary additive comprising a salt-containing inhibitor and a dispersant, wherein the grout additive fluid is absent an aqueous swellable clay, wherein at least about 90% of the dispersant and the salt-containing inhibitor are dissolved in the fresh water base fluid;
   (b) second, introducing an aqueous swellable clay into the grout additive fluid, thereby forming a final grout fluid; and
   (c) third, introducing the final grout fluid into an annulus in a subterranean formation, the annulus formed between an exterior of a geothermal well loop tubular and the subterranean formation.

2. The method of claim 1, wherein the aqueous swellable clay is natural or synthetic, and selected from the group consisting of a member of the smectite family, a member of the palygorskite-sepiolite phyllosilicate family, a member of the kaolinite-serpentine family, nontronite, bentonite, hectorite, attapulgite, fluoromica, montmorillonite, beidellite, saponite, sepiolite, kaolinite, illite, any cation exchanged version thereof, and any combination thereof.

3. The method of claim 1, wherein the salt-containing inhibitor is selected from the group consisting of a cation and an anion, a polymer, a silicate, a partially hydrolyzed polyvinyl acetate, a polyacrylamide, a partially hydrolyzed polyacrylamide, a polyalkylene glycol, a polyalkylene alcohol, a polyalkylene alkoxylate, a polyalkylene oligomer, a polyalkylene polymer, a polyalkylene copolymer, a cationic oligomer or polymer, an acid, a potassium salt, an ammonium salt, a sodium salt, an iron salt, an aluminum salt, a phosphonium salt, polyaminopolyamide-epichlorohydrin resin, diallydimethylammonium chloride, polydiallyldimethylammonium chloride, aminoethylethanolamine, diethylenetriamine, triethylenetetramine, diethanolamine, triethanolamine, polyvinyl pyrrolidone, potassium silicate, potassium carbonate, tribasic potassium phosphate, and any combination thereof.

4. The method of claim 3, wherein the cation of the salt containing inhibitor comprises a cation selected from the group consisting of lithium, potassium, sodium, hydronium, ammonium, calcium, magnesium, a quaternary amine, strontium, barium, titanium, cesium, vanadium, chromium, manganese, iron, cobalt, nickel, copper, zinc, aluminum, zirconium, and any combination thereof; and
   wherein the anion of the salt-containing inhibitor comprises an anion selected from the group consisting of chloride, bromide, nitrate, iodide, hydroxide, nitrite, hexafluoroantimonate, hexafluoroarsenate, hexafluorophosphate, propionate, lactate, tartrate, phosphate, phosphonium, borate, silicate, sulfate, acetate, aluminate, chromate, dichromate, permanganate, chlorate and perchlorate, formate, and any combination thereof.

5. The method of claim 3, wherein the cationic oligomer or polymer comprises at least one monomer selected from the group consisting of imine, alkylene imine, ethylene imine, propylene imine, amine, ethylene amine, an organoamine, a quaternary amine, acrylamide, methacrylamide, putresine, cadaverine, spermidine, spermine, diethylenetriamine, tetramethylenediamine, triethylenetetramine, tetraethylenepentamine, diallyldimethylammonium chloride, (2-methacryloyloxyethyl) trimethyl ammonium chloride, vinyl pyrrolidone, any derivative thereof, any salt thereof, and any combination thereof.

6. The method of claim 1, wherein the dispersant is selected from the group consisting of consisting of derivatives of an acid, salts of derivatives of an acid, phosphates, sodium carbonates, polymeric sodium silicate complexes, monomeric sodium silicate complexes, lignite compounds, and low molecular weight polymers, soaps, surfactants, sulfonates, and any combination thereof.

7. The method of claim 1, wherein the primary additive further comprises a thermally conductive material selected from the group consisting of graphite, sand, quartz silica, a carbon nanotube, graphene, boron nitride, brass, a brass alloy, chrome nickel steel, carbon steel, stainless steel, a transition metal, a transition metal alloy, a post-transition metal, a post-transition metal alloy, an alkaline earth metal, an alkaline earth metal alloy, and any combination thereof.

8. The method of claim 1, wherein the grout additive control package further comprises a secondary additive selected from the group consisting of a thermally insulative material, a cementitious material, and any combination thereof.

9. The method of claim 8, wherein the thermally insulative material is a particulate composed of a material selected from the group consisting of glass, diatomaceous earth, polyurethane, polyurethane foam, polystyrene, perlite, fiberglass, cork, wood, straw, rock wool, mineral wool, cellulose, and any combination thereof.

10. The method of claim 8, wherein the cementitious material is selected from the group consisting of a hydraulic cement, a non-hydraulic cement, and any combination thereof.

11. The method of claim 1, further comprising hydrating the final grout fluid to a viscosity in the range of from about 20 cP to about 500 cP prior to step (c).

12. The method of claim 1, further comprising (d) setting the final grout fluid.

13. The method of claim 12, wherein the set final grout fluid has a low permeable hydraulic seal of less than about $1\times10^{-7}$ cm/s.

14. The method of claim 1, further comprising a tremie extending into the annulus in the subterranean formation and a pump fluidly coupled to the tremie, wherein step (c) includes introducing the final grout fluid into the annulus through the tremie.

15. A method comprising:
(a) first, preparing a grout additive fluid comprising a fresh water base fluid and a grout additive control package comprising a primary additive comprising a salt-containing inhibitor and a dispersant, wherein the grout additive fluid is absent an aqueous swellable clay, wherein at least about 90% of the dispersant and the salt-containing inhibitor are dissolved in the fresh water base fluid;
(b) second, introducing an aqueous swellable clay into the grout additive fluid, thereby forming a final grout fluid, wherein the salt-containing inhibitor is present in an amount in the range of from about 0.001% to about 5% by weight of the final grout fluid,
wherein the dispersant is present in an amount in the range of from about 0.001% to about 1% by weight of the final grout fluid,
wherein a thermally conductive material is present in an amount in the range of from about 5% to about 75% by weight of the final grout fluid, and
wherein the aqueous swellable clay is present in an amount in the range of from about 5% to about 40% by weight of the final grout fluid; and
(c) third, introducing the final grout fluid into an annulus in a subterranean formation, the annulus formed between an exterior of a geothermal well loop tubular and the subterranean formation.

16. The method of claim 15, wherein the grout additive control package further comprises a secondary additive selected from the group consisting of a thermally insulative material, a cementitious material, and any combination thereof.

17. The method of claim 15, further comprising hydrating the final grout fluid to a viscosity in the range of from about 20 cP to about 500 cP prior to step (c).

18. The method of claim 15, further comprising (d) setting the final grout fluid.

19. The method of claim 18, wherein the set final grout fluid has a low permeable hydraulic seal of less than about $1\times10^{-7}$ cm/s.

20. The method of claim 15, further comprising a tremie extending into the annulus in the subterranean formation and a pump fluidly coupled to the tremie, wherein step (c) includes introducing the final grout fluid into the annulus through the tremie.

* * * * *